(12) United States Patent
Collignon et al.

(10) Patent No.: US 7,797,518 B2
(45) Date of Patent: Sep. 14, 2010

(54) GENERATING INSTRUCTION SETS FOR COMPACTING LONG INSTRUCTIONS

(75) Inventors: André Maria François Collignon, Leuven (BE); Koenraad Pieter Lodewijk Van Nieuwenhove, Asse (BE)

(73) Assignee: ARM Limited, Cambridge (GB)

( * ) Notice: Subject to any disclaimer, the term of this patent is extended or adjusted under 35 U.S.C. 154(b) by 851 days.

(21) Appl. No.: 11/220,911

(22) Filed: Sep. 8, 2005

(65) Prior Publication Data

US 2007/0055850 A1    Mar. 8, 2007

(51) Int. Cl.
*G06F 7/38* (2006.01)
(52) U.S. Cl. ..................... 712/227
(58) Field of Classification Search ............ 712/227
See application file for complete search history.

(56) References Cited

U.S. PATENT DOCUMENTS

| | | | | |
|---|---|---|---|---|
| 4,295,218 A | * | 10/1981 | Tanner | 714/762 |
| 5,574,913 A | * | 11/1996 | Ohtsu | 712/220 |
| 6,044,450 A | * | 3/2000 | Tsushima et al. | 712/24 |

* cited by examiner

*Primary Examiner*—Eddie P Chan
*Assistant Examiner*—John Lindlof
(74) *Attorney, Agent, or Firm*—Nixon & Vanderhye P.C.

(57) ABSTRACT

A method of generating at least one instruction set from a plurality of program instructions, said plurality of program instructions comprising a plurality of instruction fields each of said instruction fields operable on decoding to generate control signals for transmission by individual command buses, said method comprising the steps of: determining which combination of command buses each instruction is operable to communicate control signals to and forming a cluster of instructions from instructions that communicate control signals to a same combination of command buses; developing at least one instruction set for at least some of said instruction clusters, said at least one instruction set having fewer bits than said program instruction; specifying a number of identification bits within said at least one instruction set operable to identify said instruction set; determining a number of bits required for each instruction field within said at least one instruction set to specify all possible control signals that can be sent by said at least one instruction set along a respective one of said command buses and reallocating any bits that are allocated to said instruction field that are in excess of said determined required number to said identification bits, such that an increased number of different instruction sets can be identified by said identification bits.

20 Claims, 7 Drawing Sheets

| | Command bus width | | | | Frequency of use |
|---|---|---|---|---|---|
| 50A | 50B | 50C | 50D | 50E | |
| 2 | 11 | 4 | 3 | 7 | |
| ✓ | | ✓ | | | 70 |
| | ✓ | | ✓ | | 52 |
| ✓ | | ✓ | ✓ | | 46 |
| ✓ | | ✓ | | ✓ | 80 |

Fig. 3

GENERATING INSTRUCTION SETS FOR COMPACTING LONG INSTRUCTIONS

BACKGROUND OF THE INVENTION

1. Field of the Invention

This invention relates to the field of data processing systems. More particularly, this invention relates to data processing systems having a plurality of data path elements operable independently to perform in parallel respective data processing operations specified by a program instruction, such as, for example, a so called very long instruction word (VLIW) and measures to reduce program code size for such systems.

2. Description of the Prior Art

VLIW data processors, or data processors having very long instruction words, explicitly encode multiple independent operations within each instruction thereby allowing instruction level parallelism. This can be very efficient in some data processing, for example in pixel processing. However, in other circumstances an instruction may not need to perform a plurality of independent operations in parallel and thus, the VLIW instruction will store "dontcare" or no-op values for all unused command buses. In such circumstances there is clearly an overhead in data storage associated with the portions of the instruction that are not being valuably used.

VLIW processors such as the TMS320C6xx and SC140 processors are advantageous in providing for highly parallel execution of data processing operations. However, as the complexity of processing operations to be performed steadily increases, the high program memory storage requirements associated with these VLIW processors become a significant disadvantage.

Aditya et al (Automatic Design of VLIW and EPIC Instruction Formats, Compiler and Architecture Research HPL-1999-94, April 2000) discloses a code size reduction method for use with VLIWs. In this method a set of instruction templates that are customised to a given application or set of applications are generated, which are narrower in width than the standard VLIW of the system. A template select field allows selection of the particular template. Each template has a number of operation slots defining a particular operation from a mutually exclusive set of operations and in this way an instruction format that may be narrower than the VLIW is generated. Aditya "Code size Minimization and Retargetable Assembly for Custom EPIC and VLIW Instruction Formats" ACM Transactions on Design Automation of Electronic systems, Vol. 5 No. 4, October 2000 also discloses a code size reduction method for use with VLIWs.

SUMMARY OF THE INVENTION

Viewed from one aspect the present invention provides a method of generating at least one instruction set from a plurality of program instructions, said plurality of program instructions comprising a plurality of instruction fields each of said instruction fields operable on decoding to generate control signals for transmission by individual command buses, said method comprising the steps of: determining which combination of command buses each instruction is operable to communicate control signals to and forming a cluster of instructions from instructions that communicate control signals to a same combination of command buses; developing at least one instruction set for at least some of said instruction clusters, said at least one instruction set having fewer bits than said program instruction; specifying a number of identification bits within said at least one instruction set operable to identify said instruction set; determining a number of bits required for each instruction field within said at least one instruction set to specify all possible control signals that can be sent by said at least one instruction set along a respective one of said command buses and reallocating any bits that are allocated to said instruction field that are in excess of said determined required number to said identification bits, such that an increased number of different instruction sets can be identified by said identification bits.

The present invention recognises the problem of high program memory storage requirements associated with very long instruction words (VLIWs) and addresses this problem by grouping instructions together that communicate control signals to a same combination of command buses. An instruction set or an instruction format is then formed for at least some of these clusters of instructions. Each instruction set or format has a number of bits reserved as identification bits that are used to identify the particular instruction set or format. The instruction fields within the instruction set are analysed and it is determined how many different control signals can be sent along a particular command bus for each cluster of instructions. The number of bits required for the instruction field relating to that command bus to be able to uniquely specify each possible control signal is then determined. If the instruction set has more bits allocated to the field than are required, these are then reallocated to the instruction set identification field. This means that there may be additional identification bits available for this instruction set and thus, more instruction sets can be produced without increasing the bit size of the instruction set. As the instruction sets are generally not as long as the original instructions, the code is compacted and program memory storage requirements are reduced. It should be noted that by specifying the number of bits that initially identify the instruction set, prior to finding additional bits that can be used, some control of the complexity of the decoder is gained at this point. This is advantageous, as clearly there is a compromise required between compaction of program code and complexity of decoder. If the pay off for a very compact code is a complex decoder, then it is possible that no advantage is gained.

In some embodiments, said instructions are instructions to be processed by a data engine, said data engine comprising a set of n memory banks operable to store said instructions, said step of developing said at least one instruction set comprising developing said at least one instruction set to comprise a predetermined width, said predetermined width being an integer multiple of a width of one of said memory banks, said integer being less than or equal to n.

The storage within the data engine of the instructions in memory banks means that it is advantageous to have compacted instruction widths that are selected to fit into a whole number of memory banks. This can range from one bank to in some embodiments the complete set of memory banks. In other embodiments, the instructions are always narrower than the complete set of memory banks. Storing the instructions in this way, allows different instruction set widths to be used without requiring overly complex ways of addressing the different instruction sets. It should be noted that the optimal width of the memory banks is a compromise. The narrower they are, the more compaction of code is possible as you have a greater choice of widths of instruction sets, however, you require further bits to address them and control them. It has been found that memory bank widths of 8, 16 or 32 bits are convenient widths.

In other embodiments the data engines comprises a buffer between the memory banks and an instruction decoder, and in this case it is not necessary to select the instruction width to be aligned with the width of the memory banks as in this case the memory banks are decoupled from the instruction registers by the buffer.

In some embodiments said step of determining said number of bits required for each instruction field comprises receiving said number from a user.

A user can input the number of bits required for each instruction field. By allowing user input at this point, the user can control the compaction of the code and can identify meaningful operation sets (a subset of all possible control signals applicable to a particular bus) within each instruction field. This offers a user control over the final set of instruction formats or sets.

In some embodiments, said method determines said number of bits required for each instruction field by determining a number of potential control signals to be processed by each command bus within a particular cluster, to determine a number of bits required to specify said number of potential control signals.

It can be advantageous to automatically calculate the number of bits required for a particular instruction field, and in some embodiments this can be done quite simply by looking at a cluster of instructions that form an instruction set and then calculating the number of control signals produced by the cluster of instructions that are required to be sent by each command bus and thus the number of bits required to specify this.

In some embodiments, said method determines said number of bits required for each instruction field in response to both an input specifying a number received from a user, and a determination of a number of potential instructions to be processed by each command bus within a particular cluster performed by said method.

In some embodiments, it is preferred to use a combination of user input and computer calculation to try to find the optimal reduction in operation set width.

In some embodiments, the method comprises an additional step of specifying an additional number of identification bits operable to identify said instruction set in response to an input from a user.

The provision of a user input that can specify further identification bits within an instruction set allows further control bus combinations to be modelled by the instruction set. Furthermore, introducing this new parameter allows hierarchy to be introduced to the bits that identify a particular format or instruction set. This has the advantage of allowing significantly more combinations of clusters to be identified by a particular instruction set.

In some embodiments, said method is operable to develop a plurality of instruction sets, and comprises the further steps of determining an efficiency of said plurality of instruction sets and outputting an analysis report of said efficiency of said plurality of instruction sets developed by said method.

As embodiments of the present invention allow for user input, it has been found to be advantageous if the application produces an analysis report of the efficiency of a plurality of instruction sets developed by the apparatus. This allows the user to redefine an input and then calculate again an efficiency. This can help a user to optimise or at least improve a particular instruction set.

In some embodiments, said method comprises the further steps of producing and outputting an analysis report of a complexity of a decoder operable to decode said plurality of instruction sets developed by said method.

As mentioned before compaction of code can lead to a more complex decoder, thus producing an analysis report on the complexity of the decoder can help the user optimise the system trading code compaction and decoder complexity to produce a method which is appropriate.

In some embodiments said step of developing said at least one instruction set, comprises calculating a frequency of occurrence of a particular combination of command buses and a width of said instruction fields associated therewith and developing said at least one instruction set for a combination of command buses having a high frequency of occurrence and a narrow width.

The number of instruction sets that are developed by the apparatus determine to some extent the complexity of the decoder needed. For this reason, there are not instruction sets developed for all instructions. When deciding which instruction sets should be developed, the data analyser analyses both the frequency of occurrence of a particular combination of command bus communications and also the width of such an instruction set that is formed for that particular combination of command buses. The higher the frequency of occurrence and the narrower the width the greater the code compaction. Thus, by selecting instruction sets preferentially in this way, the compaction of the code can be increased without overly increasing the complexity of the decoder.

In some embodiments, said method comprising an initial step of receiving data defining said data engine.

In some embodiments, the actual data engine that the instructions are to be executed on can be input. Information regarding the data engine may affect the instruction sets that are produced and thus, this information can help produce efficient instructions sets. Thus, the method is operable to produce instruction sets for a particular data engine depending on the input received.

A further aspect of the present invention provides a computer program product operable to perform a method according to a first aspect of the present invention.

A yet further aspect of the present invention provides an apparatus operable to specify a plurality of instruction sets for use by a data engine comprising: a compiler operable to receive and compile a plurality of program instructions from at least one application for processing by said data engine, said plurality of program instructions each comprising a plurality of instruction fields each operable to generate control signals on decoding for transmission by individual command buses; a data analyser operable to analyse said compiled instructions and determine a combination of command buses operable to transmit generated control signals in response to each of said program instructions and to form clusters of instructions that communicate control signals to a same combination of command buses; wherein said apparatus is operable to develop at least one instruction set for a plurality of said instruction clusters, said at least one instruction set having fewer bits than said plurality of program instructions, said at least one instruction set comprising a number of identification bits identifying said at least one instruction set; and said apparatus is operable to determine a number of bits required for each instruction field within said at least one instruction set and to reallocate any bits allocated to said field that are in excess of said determined required number to said identification bits, such that an increased number of different instruction sets can be identified.

The above, and other objects, features and advantages of this invention will be apparent from the following detailed

BRIEF DESCRIPTION OF THE DRAWINGS

FIG. 3 shows a table giving command bus widths and their frequency of use by different instructions;

DESCRIPTION OF THE PREFERRED EMBODIMENTS

Figure 1:
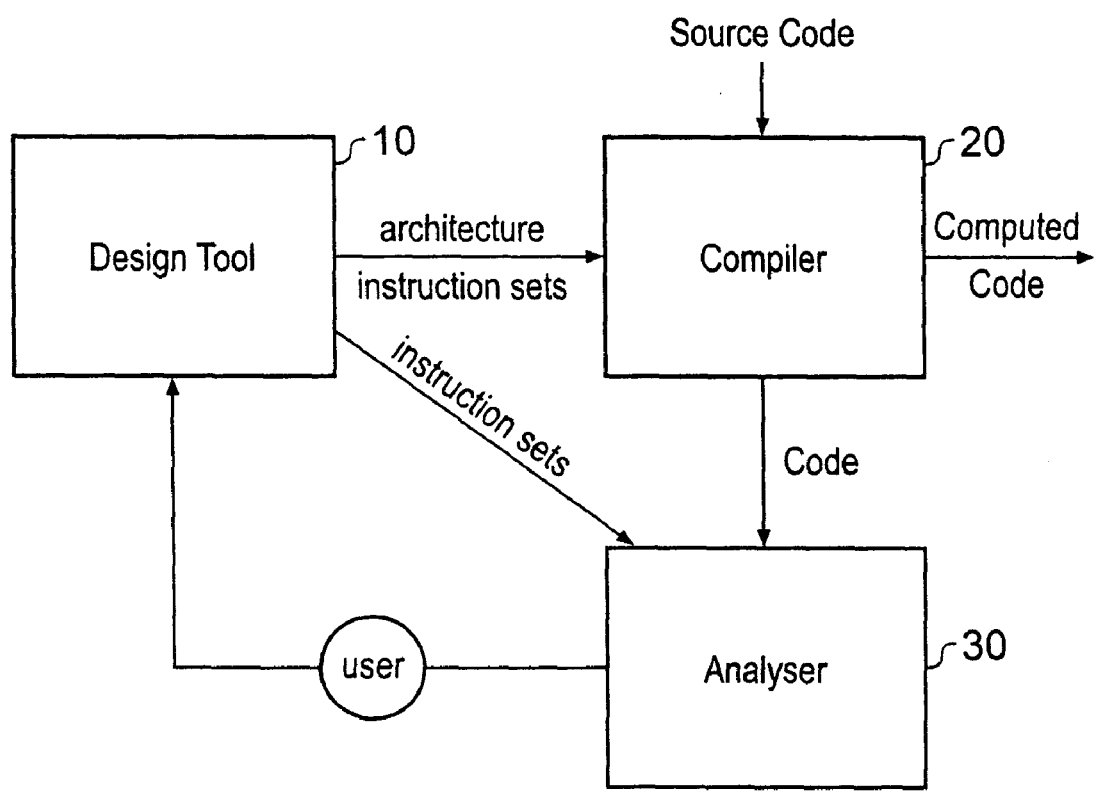
FIG. 1 schematically illustrates an apparatus according to an embodiment of the present invention.

FIG. 1 schematically shows an embodiment of the present invention. In FIG. 1, a design tool 10 outputs a proposed instruction set and an architecture for a data engine to a compiler 20. Initially, the proposed instruction set comprises only the VLIW instruction format, or any other user specified instruction set. The compiler 20 compiles the application code, (source code input in the figure), for a specified architecture and produces compiled code which is input to data analyser 30. Data analyser 30 analyses the compiled code and produces a data analysis of the instructions in which instructions that after decoding send control signals down the same set of command buses are clustered together. This analysis can be input directly back to the design tool 10 or it can be input via a user to the design tool. The design tool then produces instruction formats or instruction sets for all combinations of command buses that appear frequently and are not very wide. These are then input to the compiler, which generates the compacted code and to the analyser which uses them to produce reduced operations sets and then to produce a new analysis of the compacted code which it can compare with previous code. This will be explained in detail with respect to FIGS. 2 and 3.

Figure 2:
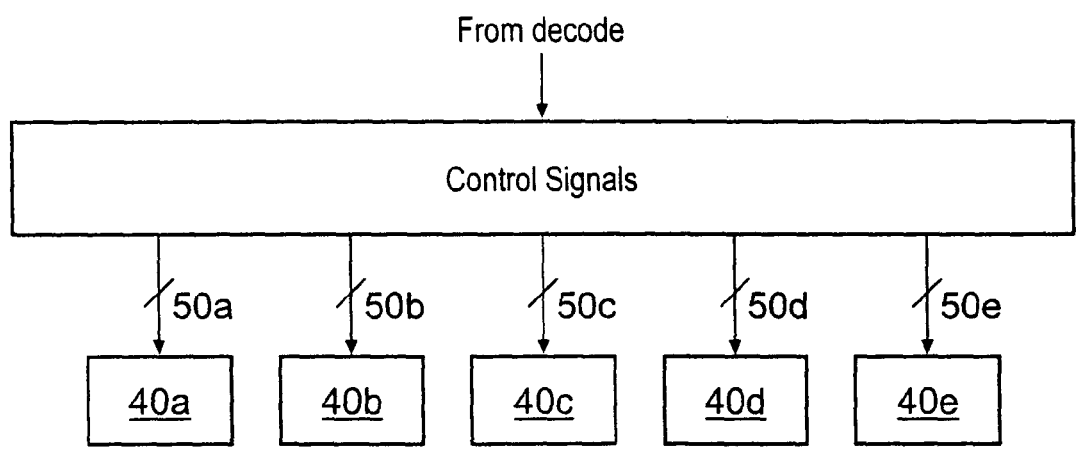
FIG. 2 schematically shows control signals from a VLIW passing through command buses to hardware resources.

FIG. 2 schematically shows how control signals produced from a VLIW are output via command buses 50a to 50e to hardware resources 40a to 40e. The command buses 50a to 50e have different widths, their respective widths depending on the number of control signals required to instruct the hardware resources 40a to 40e. Each VLIW can send control signals to each bus. However, in many cases, a particular VLIW only controls some of the hardware resources and thus, only some control signals are sent down some buses. The portion of the VLIWs reserved to control the other hardware resources therefore contain "dontcare" or "noop" bits. Analyser 30 (of FIG. 1) analyses the application's instructions and the command buses they use. It then clusters in groups instructions that use the same command buses and produces a table or histogram indicating the command buses used, the command bus widths and the frequency of their use. FIG. 3 shows such a table.

An instruction format (see for example FIG. 4) can then be produced for a particular set of command buses and is in effect an AND of the original combinations. This format (or set) has fewer bits than the original VLIW as it pertains only to a reduced set of the total number of command buses and thus, the "noop" bits for the command buses not specified by the instruction set are not needed. The command bus combinations that are selected to have their own instruction format or set are those where the total bus width is not wide and those that have a high frequency of use. This is done to increase code compaction.

Figure 4:
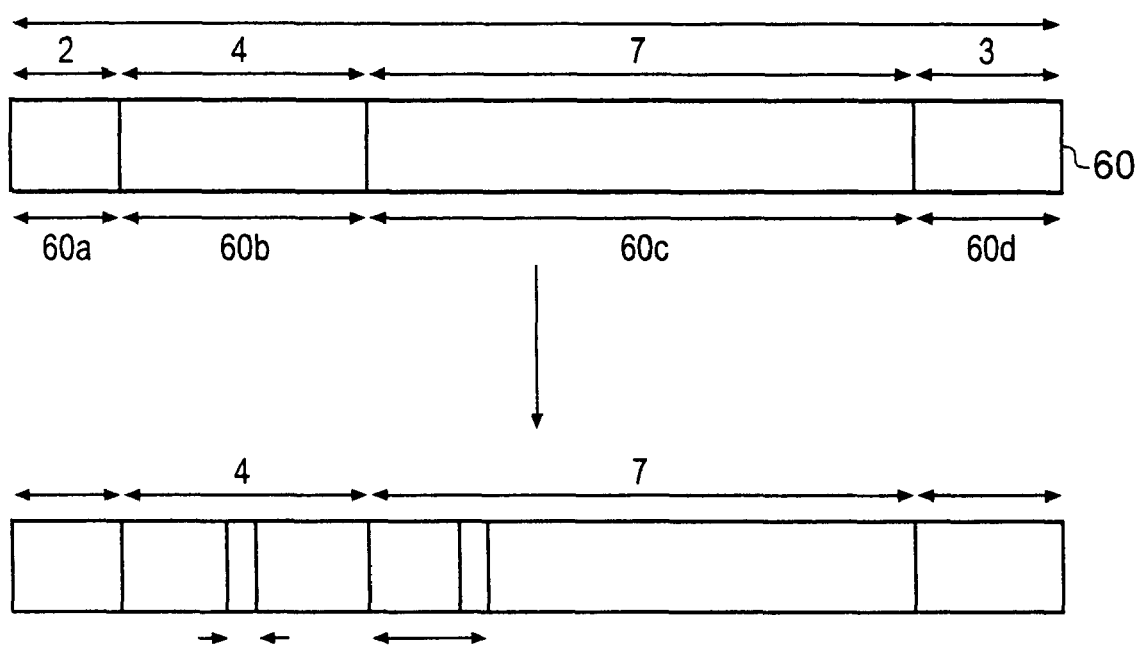
FIG. 4 shows an instruction format generated by an embodiment of the present invention.

The instruction format (or set) 60 shown in FIG. 4 is formed of portions 60a (2 bits), 60b (4 bits) and 60c (7 bits) and can be used to represent instructions which use command bus 50a having a width of two bits, command bus 50c having a width of four bits and command bus 50e having a width of seven bits. There are an additional three bits 60d which are used to identify this instruction set. The bits of 60d indicate to the controller the position of the bits relating to the different command buses, in this case it indicates that the first two bits relate to command bus 50a the subsequent four bits to command bus 50c and the next seven to command bus 50e.

A further step is then performed within the design tool 10 of FIG. 1 in which the instruction fields 60a, 60b, 60c of instruction 60 are analysed to see if they really require the number of bits that have been allocated to them. In this case as the control signals relate to instructions, it may be that within the instructions that this instruction set has been developed to mimic, only a subset of the possible number of control signals are actually sent down each command bus. In that case, it may be that instead of requiring four bits to specify all possible control signals derived from the instructions that are represented and can be sent down that command bus only three bits are required, this would leave a bit spare. Thus, this bit is allocated as an identification bit for this instruction format. This allows more instruction formats to be developed from the same number of bits. Increasing the number of identification bits allocated to field 60d can also be done under control of a user. This is described below.

In some embodiments, it is not just control signals derived from instructions that are sent along command buses, there may be control signals that encode immediate values and/or addresses. These may also be able to be compacted. For example, it could be that immediate values for the instructions that are being represented within an instruction set always have zeros in their first seven bit positions and as such seven bits from a particular portion of the immediate value are not required. Alternatively, it could be that the addresses used are addresses of registers and these registers are always filled from the bottom and in the instructions that are being represented the top five registers are never used, thus, the number of bits used to identify the registers can be reduced. In all cases, the additional bits that are not required to represent a particular value, i.e. the saved bits can be used to identify the instruction set and thus more instruction sets can be produced for the same number of bits.

It should be noted from FIG. 1 that there is a possible user input between the data analyser and the design tool. When determining the width of the instruction field that is really required, it can be that the design tool calculates this from, for example, the known number of instructions that are used. However, it could also be that the user specifies this from say his knowledge of the immediate values. The user can also input other information that may be valuable to producing a preferred instruction set, such as information on which command buses will not be used together for certain instructions. Furthermore, an analysis of the complexity of the decoder required for particular instruction sets can be produced by the analyser and a user can select a desired complexity and thereby rule out certain instruction sets which need too complex a decoder. The analyser can also produce an analysis of the efficiency of the compacted code, either on its own or as a comparison with the original instructions' efficiency. This can be helpful to the user when trying to optimise the compacted code for a particular purpose.

In some embodiments, the user can also reserve additional bits for field 60*d*, the field that identifies the instruction set. Thus, additional identification bits are allocated to this field enabling additional control bus combinations to be modelled by a particular instruction set.

Figure 5:
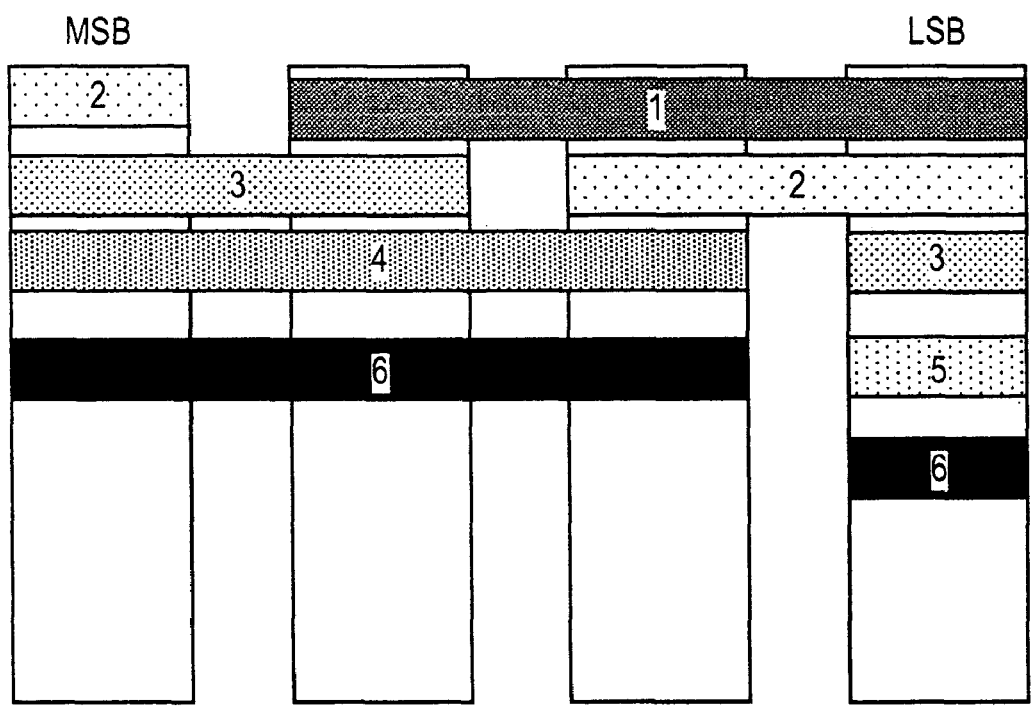
FIG. 5 shows a set of memory banks operable to store instructions within a data engine.

In producing an instruction set, the number of bits used for a particular instruction set, is selected so that an instruction from that instruction set can be stored in the data engine, where it is to be used. FIG. 5 shows the memory banks of a data engine, and in some embodiments the instruction sets are selected to be an integer number of these wide, so that they are stored in a complete number of memory banks. A VLIW may be the width of the entire bank, or in some embodiments the memory banks may be wider than a VLIW. By selecting the instructions sets in this way the transfer of instructions from the memory banks to instruction register banks, which are the same width as the memory banks is simplified.

In other embodiments the data engine has a buffer between the memory banks and the instruction register so that the link between the instruction registers and memory banks is decoupled. In such a case the instruction sets no longer need to be selected to be an integer number of memory banks wide.

Figure 6:
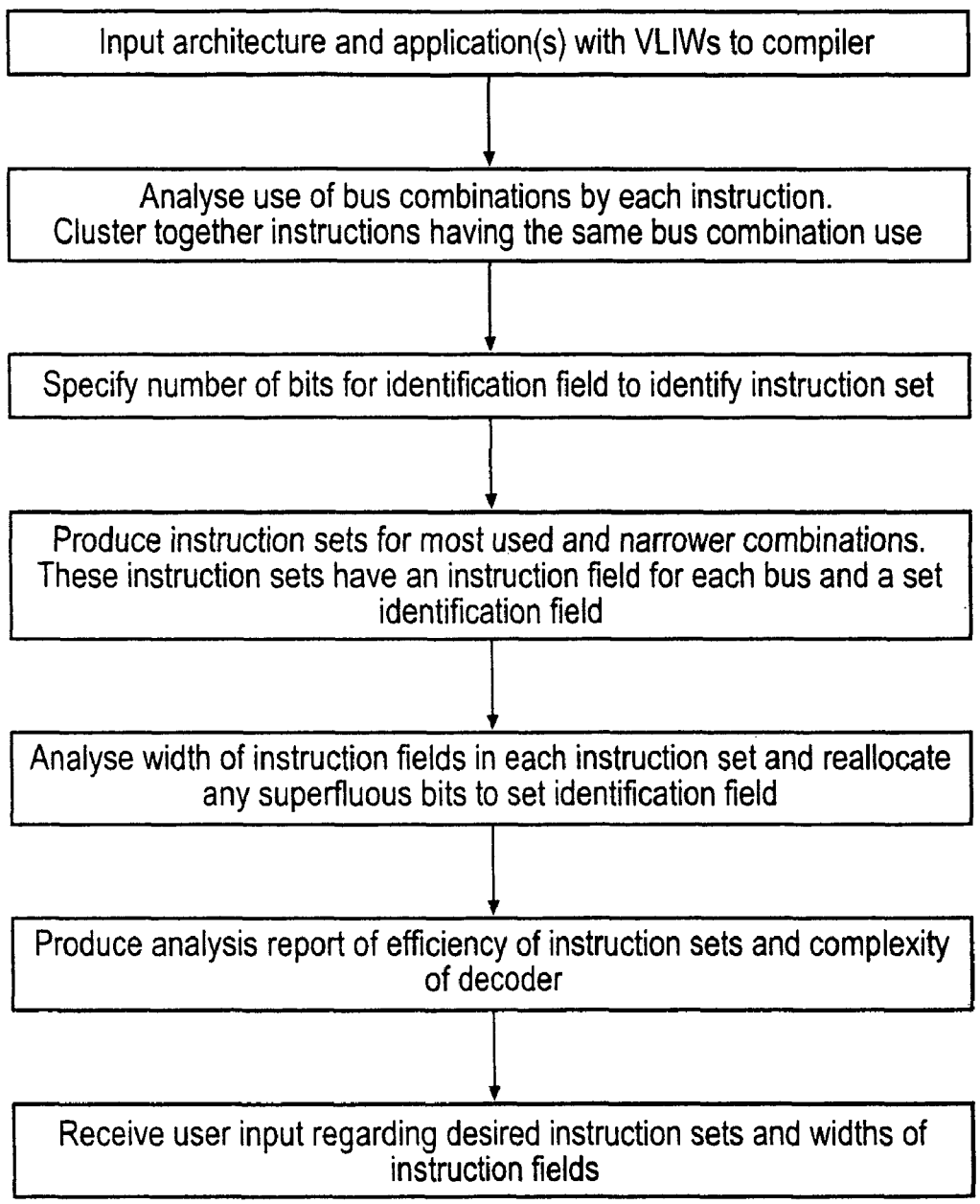
FIG. 6 shows a flow diagram illustrating steps of a method for compacting code according to an embodiment of the present invention.

FIG. 6 shows a flow diagram indicating a method according to an embodiment of the present invention.

In the initial step, the architecture of the data engine that is being analysed and the applications that are to be run on it are input to the compiler. The applications are formed of VLIWs. The next step involves an analysis of the use of bus combinations by each instruction and the clustering together of those instructions that have the same control bus usage. An analysis of the width of the instruction field in each instruction set is then made and any bits that it is determined are not required within this field are reallocated as identification bits to identify the instruction set. Although this is shown as being done after steps one and two in this diagram, it can be performed in parallel to them.

The next step involves the production of instruction formats or instruction sets for the most used bus combinations that are not too wide.

A further step may then be performed in which an analysis report of the instruction set and the complexity of the decoder is produced. In response to this analysis report, the user can have an input and thereby, for example, eliminate some of the instruction sets, or alter the instruction fields. By providing these analysis reports and allowing a user input, a compromise between decoder complexity and instruction width compaction can be made in conjunction with the user which suits the users needs.

This is a highly efficient and user-friendly way of producing instruction sets that can be applied by the compiler to produce compacted instruction code.

Figure 7:
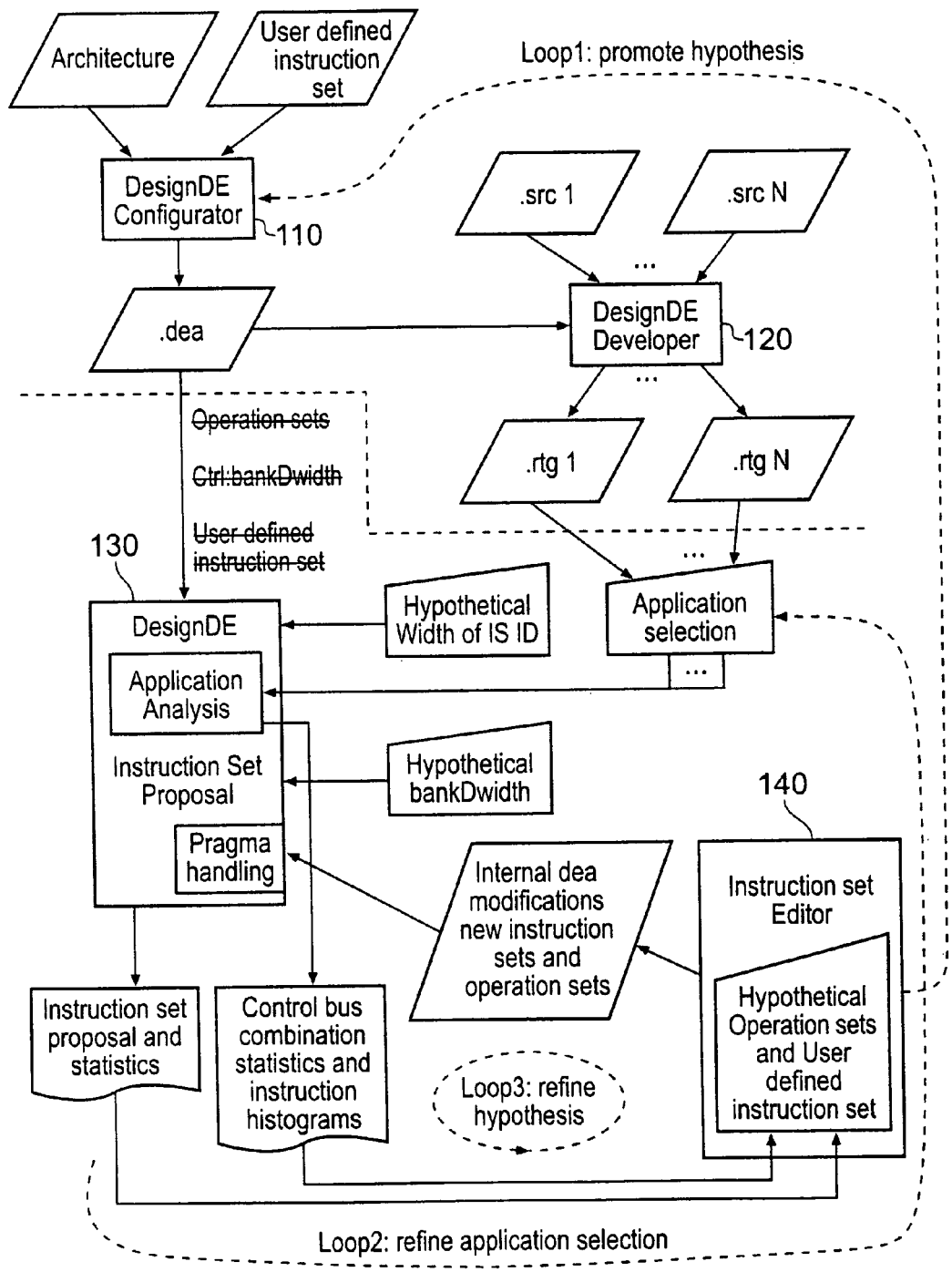
FIG. 7 shows an embodiment of the invention in the context of a particular data engine.

FIG. 7 schematically shows an embodiment of the invention in the context of a particular data engine. This is similar to the very simplified apparatus of FIG. 1, with the designDE configurator 110 corresponding to design tool 10, designDE developer 120 corresponding to compiler 20 and designDE instruction set proposal 130 corresponding to analyser 30 of FIG. 1.

In this embodiment the loop of FIG. 1 is broken by introducing an instruction set editor 140. This interactive tool (which is also used to specify the input to DesignDE Configurator) may serve to specify 'hypothetical' values for all parameters of the analyser 130: memory bank width, number of banks, partial operation sets, and even a user defined instruction set for validation purposes. The internal data structures representing the compiled program code from the different applications (in .rtg files) may then be reused by different iterations of the analyser.

This has the following advantages:
no recompilation of applications is needed: loop1 is broken. This considerably speeds up the design of instruction sets using the analyser.
2 different flows become available to steer the analyser:
1) loop3: different 'hypotheses' for the instruction sets may very rapidly be applied to the analyser on a fixed selection of applications.
2) loop2: different selections of applications may lead to different instruction sets.

Thus this selection mechanism may lead to domain specific instruction sets for code compaction.

It should be noted that the information from the .dea-file, i.e. operation sets, ctrl:bankdwidth and User defined instructions set that are sent to designDE instruction set proposal 130 are only used in loop1. In loop2 and loop3 there is no need to extract this data from the .dea-file because these loops work with hypothetical values for this data. For this reason these values are shown on the Figure with a line through them.

In this version of the tool the analyser consists of the following parts:
pragma handler (to process the user defined instruction sets, including the partial operation sets);
applications selection mechanism;
applications analysis algorithm to determine required bus combinations;
clustering algorithms to generate a proposal: optimal applications; specific instruction sets; and
report generators.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of generating at least one instruction set from a plurality of program instructions, said plurality of program instructions comprising a plurality of instruction fields each of said instruction fields operable on decoding to generate control signals for transmission by individual command buses, said method comprising the steps of:

determining which combination of command buses each instruction is operable to communicate control signals to and forming a cluster of instructions from instructions that communicate control signals to a same combination of command buses;

developing at least one instruction set for at least some of said instruction clusters, said at least one instruction set having fewer bits than said program instruction;

specifying a number of identification bits within said at least one instruction set operable to identify said instruction set;

determining a number of bits required for each instruction field within said at least one instruction set to specify all possible control signals that can be sent by said at least one instruction set along a respective one of said command buses and reallocating any bits that are allocated to said instruction field that are in excess of said determined required number to said identification bits, such that an increased number of different instruction sets can be identified by said identification bits.

2. A method according to claim 1, wherein said instructions are instructions to be processed by a data engine, said data engine comprising a set of n memory banks operable to store said instructions, said step of developing said at least one instruction set being operable to develop said at least one instruction set to comprise a predetermined width, said predetermined width being an integer multiple of a width of one of said memory banks, said integer being less than or equal to n.

3. A method according to claim 1, wherein said step of determining said number of bits required for each instruction field comprises receiving said number from a user.

4. A method according to claim 1, wherein said method determines said number of bits required for each instruction field by determining a number of potential control signals to be processed by each command bus within a particular cluster, to determine a number of bits required to specify said number of potential control signals.

5. A method according to claim 1, wherein said method determines said number of bits required for each instruction field in response to both an input specifying a number received from a user, and a determination of a number of potential control signals to be processed by each command bus within a particular cluster performed by said method.

6. A method according to claim 1, comprising an additional step of specifying an additional number of identification bits operable to identify said instruction set in response to an input from a user.

7. A method according to claim 1, wherein said method is operable to develop a plurality of instruction sets, and comprises the further steps of determining an efficiency of said plurality of instruction sets and outputting an analysis report of said efficiency of said plurality of instruction sets developed by said method.

8. A method according to claim 7, wherein said method comprises the further steps of producing and outputting an analysis report of a complexity of a decoder operable to decode said plurality of instruction sets developed by said method.

9. A method according to claim 1, wherein said step of developing said at least one instruction set, comprises calculating a frequency of occurrence of a particular combination of command buses and a width of said instruction fields associated therewith and developing said at least one instruction set for a combination of command buses having a high frequency of occurrence and a narrow width.

10. A method according to claim 1, said method comprising an initial step of receiving data defining said data engine.

11. A computer program product comprising a computer readable storage medium containing computer readable instructions that when executed are operable to perform a method according to claim 1.

12. An apparatus operable to specify a plurality of instruction sets for use by a data engine comprising:
a compiler operable to receive and compile a plurality of program instructions from at least one application for processing by said data engine, said plurality of program instructions each comprising a plurality of instruction fields each operable to generate control signals on decoding for transmission by individual command buses;
a data analyser operable to analyse said compiled instructions and determine a combination of command buses operable to transmit generated control signals in response to each of said program instructions and to form clusters of instructions that communicate control signals to a same combination of command buses; wherein
said apparatus is operable to develop at least one instruction set for a plurality of said instruction clusters, said at least one instruction set having fewer bits than said plurality of program instructions, said at least one instruction set comprising a number of identification bits identifying said at least one instruction set; and
said apparatus is operable to determine a number of bits required for each instruction field within said at least one instruction set and to reallocate any bits allocated to said field that are in excess of said determined required number to said identification bits, such that an increased number of different instruction sets can be identified.

13. An apparatus according to claim 12, wherein said data engine comprises a set of n memory banks operable to store instructions, said apparatus being operable to develop said at least one instruction set to comprise a predetermined width, said predetermined width being an integer multiple of a width of one of said memory banks, said integer being less than or equal to n.

14. An apparatus according to claim 12, wherein said apparatus is operable to determine a number of bits required for each instruction field in response to an input specifying said number received from a user.

15. An apparatus according to claim 12, wherein said apparatus is operable to determine said number of bits required for each instruction field by determining a number of potential instructions to be processed by each command bus within a particular cluster, to determine a number of bits required to specify said number of potential instructions.

16. An apparatus according to claim 12, wherein said apparatus is operable to determine a number of bits required for each instruction field in response to both an input specifying a number received from a user, and a determination of a number of potential instructions to be processed by each command bus within a particular cluster performed by said apparatus.

17. An apparatus according to claim 12, wherein said apparatus is operable to develop a plurality of instruction sets and to produce and output an analysis report of an efficiency of said plurality of instruction sets developed by said apparatus.

18. An apparatus according to claim 12, wherein said apparatus is operable to develop a plurality of instruction sets and to produce and output an analysis report of a complexity of a decoder operable to decode said plurality of instruction sets developed by said apparatus.

19. An apparatus according to claim 12, wherein said data analyser is operable to calculate a frequency of occurrence of a particular combination of command buses and a width of said instruction fields associated therewith and to develop said at least one instruction set for a combination of command buses having a high frequency of occurrence and a narrow width.

20. An apparatus according to claim 12, comprising an input operable to receive data defining said data engine.

* * * * *